United States Patent
Arguelles

(10) Patent No.: US 7,941,418 B2
(45) Date of Patent: May 10, 2011

(54) DYNAMIC CORPUS GENERATION

(75) Inventor: Carlos Alejandro Arguelles, Shoreline, WA (US)

(73) Assignee: Microsoft Corporation, Redmond, WA (US)

( * ) Notice: Subject to any disclaimer, the term of this patent is extended or adjusted under 35 U.S.C. 154(b) by 1505 days.

(21) Appl. No.: 11/270,014

(22) Filed: Nov. 9, 2005

(65) Prior Publication Data
US 2007/0106977 A1   May 10, 2007

(51) Int. Cl.
*G06F 7/00*   (2006.01)
*G06F 17/30*   (2006.01)
(52) U.S. Cl. .................................... 707/708; 707/739
(58) Field of Classification Search .................. 707/709, 707/711, 740, 715, 725, 737, 708
See application file for complete search history.

(56) References Cited

U.S. PATENT DOCUMENTS

| | | | |
|---|---|---|---|
| 6,263,364 B1 * | 7/2001 | Najork et al. ................. | 709/217 |
| 6,272,456 B1 * | 8/2001 | de Campos ....................... | 704/8 |
| 6,321,265 B1 * | 11/2001 | Najork et al. ................. | 709/224 |
| 6,516,312 B1 * | 2/2003 | Kraft et al. ..................... | 707/610 |
| 7,158,930 B2 * | 1/2007 | Pentheroudakis et al. ...... | 704/10 |
| 2003/0033288 A1 * | 2/2003 | Shanahan et al. ................ | 707/3 |
| 2004/0161150 A1 * | 8/2004 | Cukierman et al. ........... | 382/186 |
| 2004/0210434 A1 * | 10/2004 | Wang et al. ....................... | 704/9 |
| 2005/0197829 A1 * | 9/2005 | Okumura ......................... | 704/10 |
| 2005/0251384 A1 * | 11/2005 | Yang ................................ | 704/10 |

* cited by examiner

*Primary Examiner* — Kuen S Lu
*Assistant Examiner* — Hexing Liu
(74) *Attorney, Agent, or Firm* — Westerman, Champlin & Kelly, P.A.

(57) ABSTRACT

A computer-implemented method of generating a dynamic corpus includes generating web threads, based upon corresponding sets of words dequeued from a word queue, to obtain web thread resulting URLs. The web thread resulting URLs are enqueued in a URL queue. Multiple text extraction threads are generated, based upon documents downloaded using URLs dequeued from the URL queue, to obtain text files. New words are randomly obtained from the text files, and the randomly obtained words from the text files are enqueued in the word queue. This process is iteratively performed, resulting in a dynamic corpus.

19 Claims, 6 Drawing Sheets

DYNAMIC CORPUS GENERATION

BACKGROUND

The discussion below is merely provided for general background information and is not intended to be used as an aid in determining the scope of the claimed subject matter.

Linguistic testers constantly need corpora or corpus (bodies of sentences in a particular human language) to debug, test and assess the linguistic systems that are being developed. These linguistic systems may include features such as word-breakers, spellers, grammar-checkers, search engines, machine translation and many more. A typical approach is to license corpora from vendors, for example digital versions of encyclopedias and books, news articles and so forth. However, there are a number of disadvantages to this approach.

For example, it can become extremely expensive to acquire large quantities of corpora. Also, it can be difficult to find a vendor for languages that are spoken by a small number of people such as Maori or Nepali. Further, the corpora that can be acquired from vendors are typically well edited. As a result, they are not useful for testing linguistic systems such as the spellers and the grammar checkers because they are not representative of "real-world" writing scenarios where an informal user would make lots of editing mistakes. Another disadvantage of licensing corpora is that they tend to be fixed and limited. Consequently, the linguistic system may become tuned to specific corpus and not work well for linguistic phenomena that are not present in the corpus.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computer-implemented method is provided for gathering large volumes of text from the web for Natural Language Processing. This method generates a dynamic corpus, which is useful in training natural language processing systems so that the systems do not become tuned to specific corpus, such that they do not work well for linguistic phenomena not present in the specific corpus. The disclosed method of generating a dynamic corpus includes generating web threads, based upon corresponding sets of words dequeued from a word queue, to obtain resulting URLs. The resulting URLs are enqueued in a URL queue. Multiple text extraction threads are generated, based upon documents downloaded using URLs dequeued from the URL queue, to obtain text files. New words are randomly obtained from the text files, and the randomly obtained words from the text files are enqueued in the word queue for use in generating additional web threads. This process is iteratively performed, resulting in a dynamic corpus. In addition to computer-implemented methods, computer-readable medium and dynamic corpus generating systems are provided.

DETAILED DESCRIPTION

Disclosed embodiments include a Dynamic Corpus Generator (or "DCG") which can interact with web search engines. A web search engine is here defined as any portal that allows sending a query or search request including any number of words and returns a number of hits, that is documents containing the words requested. The DCG sends combinations of predefined words in random order as search requests to the web search engines, which return a list of web sites that have those words present in their text. The web sites are in a particular human language such as English, Norwegian or Hindi. The DCG then downloads these web pages, extracts the raw text (sentences) from the binary formats (e.g. HTML, Word, PDF) and adds the sentences to the corpora. It also picks random words from these sentences for use with future search requests, thereby creating a self-feeding loop that can continually create new searches and update the corpus.

The resulting corpora need not be directly used in the development of products, but rather if preferred, statistical tools can be run to generate information that can aid assessment of product. For example, information can be generated on word counts, word relationships, misspellings, and even crashes on the functional side. In example embodiments described in detail below, the DCG has a queuing system that throws away older sentences as new ones are acquired, so the corpus is continuously "refreshed" becoming in fact a "dynamic corpus." In this respect, the DCG can be considered to behave like a caching mechanism in a web browser.

The disclosed embodiments of the DCG can be used to address some or all of the problems associated with conventional practices of licensing corpora. For example, using the DCG the sentence acquisition process can be scaled as desired to collect any number of sentences. Also, the DCG and disclosed methods can be used to collect corpora for any number of uncommon or unusual human languages, since the world wide web search can be targeted to a particular language, country, data type or format as will be described in further detail below. Also, the corpus acquired by the DCG can be constantly changing, so a linguistic system will never become fully trained on any characteristics of it.

Figure 1:
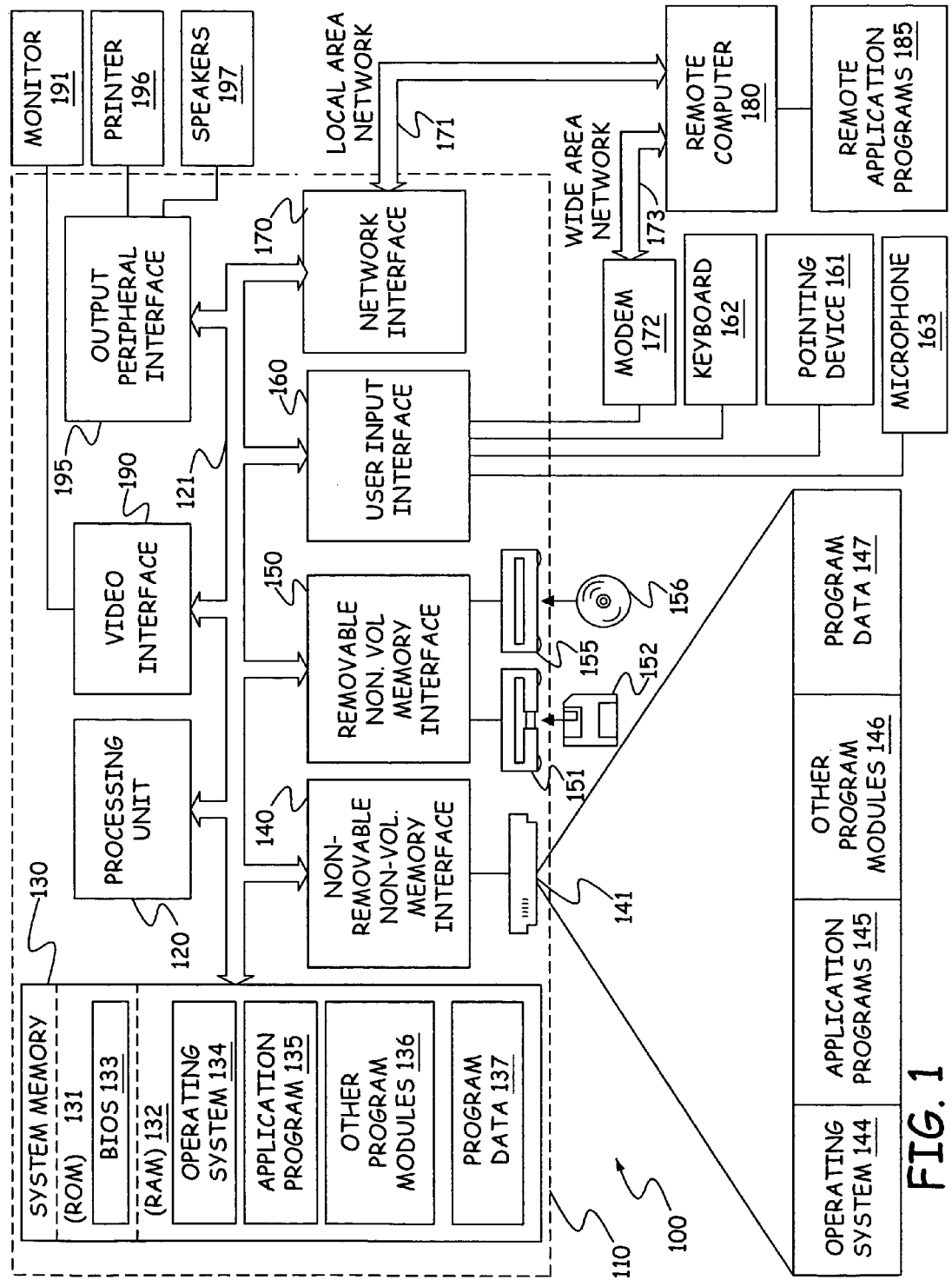
FIG. 1 is a block diagram of a general computing environment in which disclosed concepts can be practiced.

The disclosed DCG methods, apparatus and systems can be embodied in a variety of computing environments, including personal computers, server computers, etc. Before describing the embodiments in greater detail, a discussion of an example computing environment in which the embodiments can be implemented may be useful. FIG. 1 illustrates one such computing environment which can represent any of these different types of computing environments.

FIG. 1 illustrates an example of a suitable computing system environment 100 on which one or more aspects of the illustrated embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
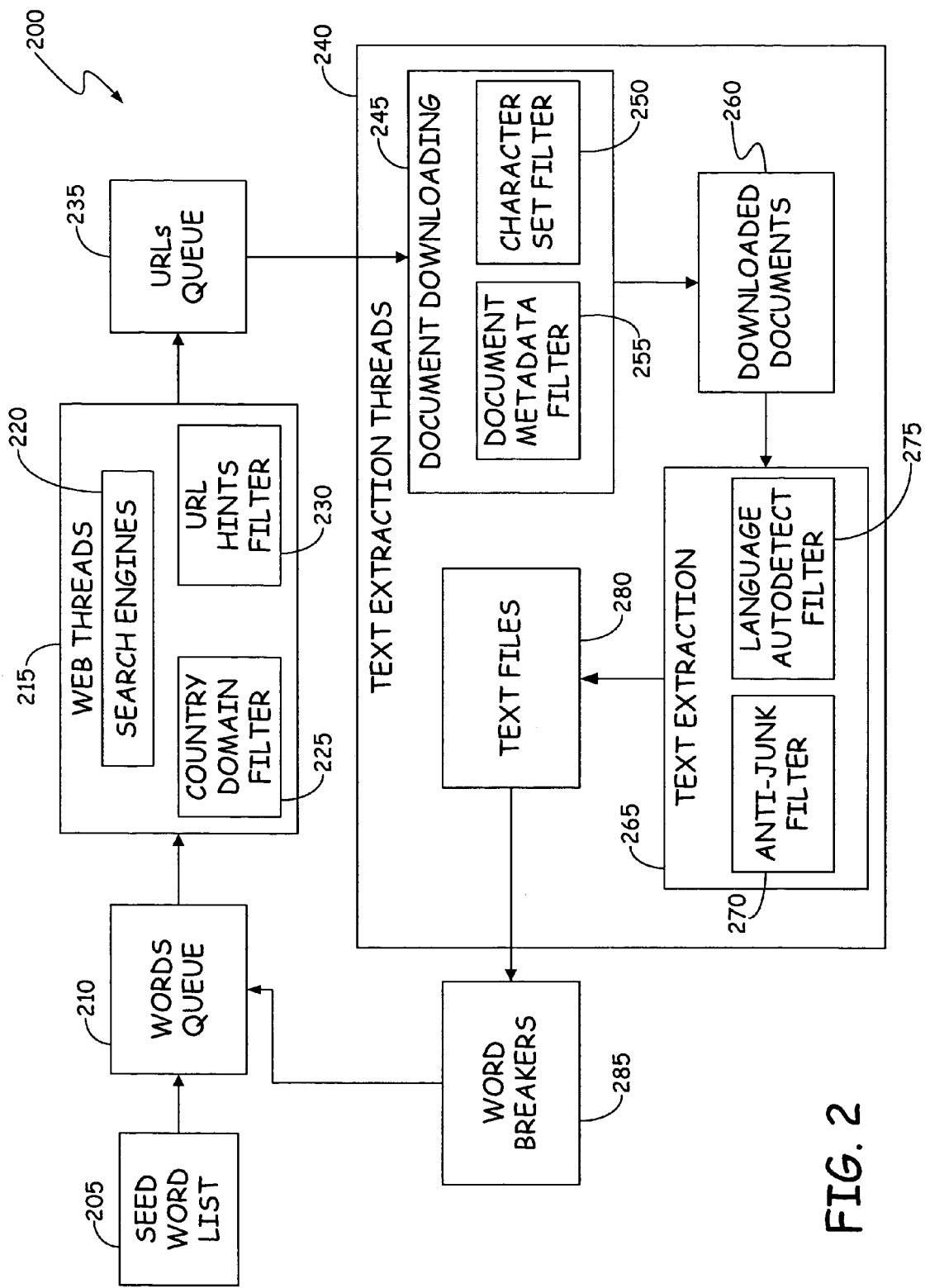
FIG. 2 is a block diagram illustrating an embodiment of a dynamic corpus generator.
Figure 3:
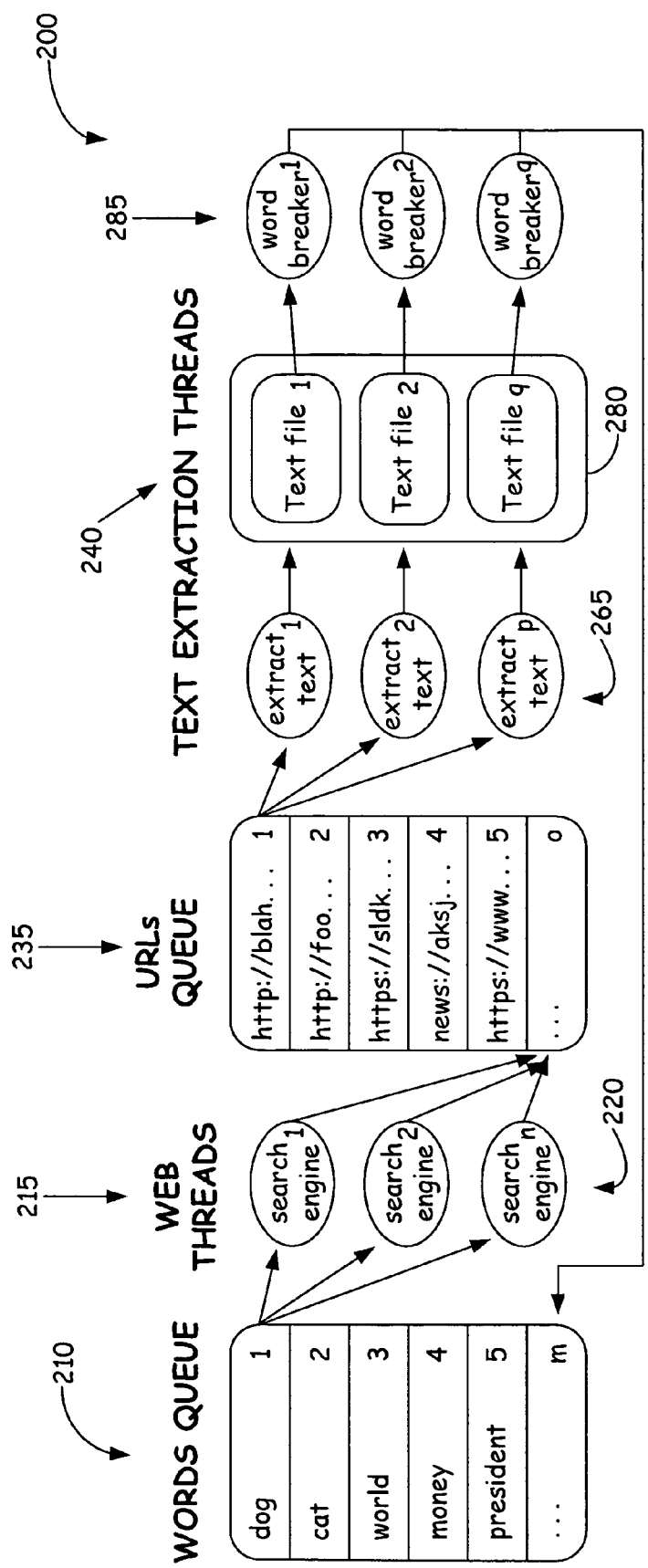
FIG. 3 is a diagrammatic illustration of the dynamic corpus generator shown in FIG. 2.

Referring now to FIG. 2, shown is a block diagram illustrating DCG 200 (also referred to as a DCG system) in accordance with some disclosed embodiments. FIG. 3 is a diagrammatic illustration of portions of DCG 200 which provides an intuitive understanding of the process by which DCG operates to generate a dynamically changing corpus. These figures are described together for illustrative purposes.

As shown in FIG. 2, the DCG starts with a hard coded list of words in a target language, which is called the "seed." The seed word list 205 is ideally a balanced list of words that are unique and representative of the language, and common enough that they will occur frequently in documents in the target language. If there are languages that are easily confused such as Malay and Indonesian, the seed for one language should consist of words that would not be frequent in the other language. The seed is typically created by hand. However, because in exemplary embodiments it is randomly shuffled with every use, it can be reused any number of times with different results each time if it is large enough (typically 5,000-10,000 words will suffice).

The DCG system 200 shuffles the wordlist and "pushes" the words into the words queue 210. A "queue" is a collection of objects such that elements are only added at the end and only removed from the beginning, so that elements are taken out in the order in which they are added. An illustrative example of a portion of a populated words queue 210 is provided in FIG. 3. Seed word list 205 and words queue 210 are each, for example, data files stored in memory included in, or associated with, DCG 200. For example, seed word list 205 and words queue 210 can be stored in memory of a computing environment such as that shown in FIG. 1. The same is true of other queues, documents and text files described below.

DCG system 200 includes web threads 215, which can be processing circuitry or components, for example processing unit 120 shown in FIG. 1, suitably programmed with search engine application software (search engines 220). As shown in FIG. 3, n search engine instances can be used to generate n web threads. The web threads dequeue words out of words queue 210, in groups of a predefined number of words, and use these words in searches. For example, "dog cat world" in the diagram below is sent to a web search engine 220. The web search engine returns a number of hits (URLs of web pages that contain the words used in the search), and the DCG enqueues these hits in a URLs Queue 235 shown in FIGS. 2 and 3. The search engines used in web threads 215 can be n instances of the same search engine, for example MSN, or they can be instances of different search engines, for example MSN and Yahoo.

In some embodiments, the processing circuitry which implements web threads 215 also monitors the performance of the search engines 220. If a particular search engine application is exhibiting poor performance, typically in the form of running slow, the web thread processing circuitry automatically switches to a different search engine application. This feature addresses situations where search engine providers monitor IP addresses of search requesters and limit search resources (processing power, memory, etc) if one IP address is submitting a large number of queries. This feature is not required in all disclosed embodiments, however.

Figure 4:
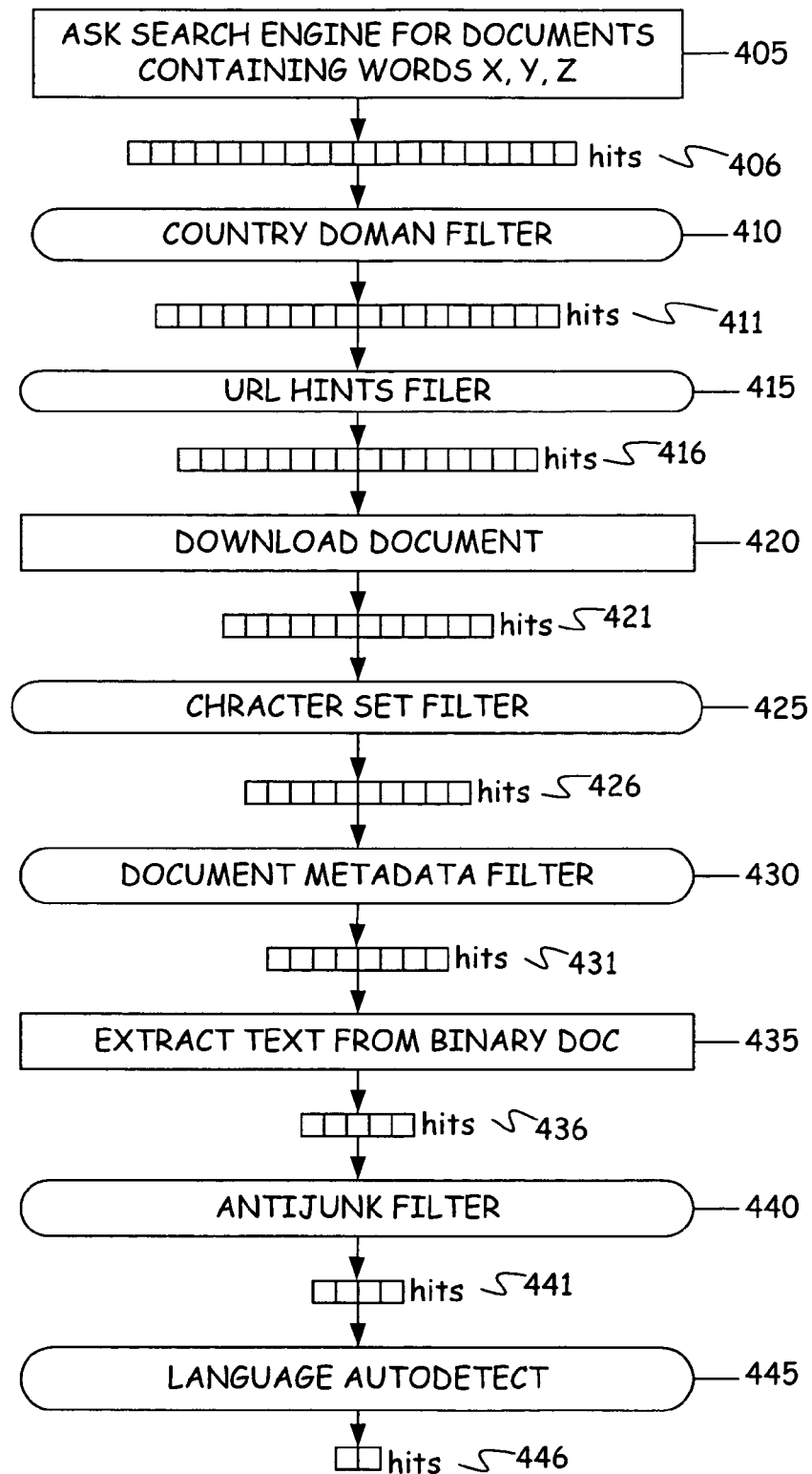
FIG. 4 is a flow diagram illustrating embodiments of disclosed methods.

As shown in FIG. 2, the web thread processing circuitry or component 215 can also be configured or programmed to implement filtering functions. The two filtering functions illustrated, namely country domain filter 225 and URL hints filter 230, are used to filter out certain URLs, or alternatively to select certain URLs, in order to control which URLs are enqueued in URLs queue 235. These filters and the corresponding steps are illustrated in FIG. 4 and are described below in greater detail.

In parallel to the web thread process described above which adds URLs to queue 235, a number of Text Extraction Threads (also represented as text extraction thread processing circuitry or component 240 in FIG. 2) dequeue URLs from the URLs queue 235, download the contents of the URLs and extract the text. The URLs can be in HTML format, Word documents, PowerPoint documents, Excel documents, Adobe PDF files, or files in any other binary data type. Using text extraction methods, for example IFilter technology, which is a Microsoft public technology known and available in the art, text extraction thread processing component 240 of the DCG extracts text from the binary format and creates a text file 280 with the sentences extracted from each URL.

In extracting text and generating text files, text extraction thread processing component 240 implements a number of functions using corresponding components or modules. For example, document downloading component 245 provides the dequeueing function described above, downloading documents (shown saved as downloaded documents 260) corresponding to URLs in URLs queue 235. As will be described below in greater detail with reference to FIG. 4, document downloading component 245 can implement filtering functions to filter out, or alternatively select certain documents, from those represented by the URLs in queue 235. The two filtering functions illustrated, namely document metadata filter 255 and character set filter 250, are illustrated in FIG. 4 in the form of corresponding steps and are also described below in greater detail.

Text extraction thread processing circuitry 240 also includes text extraction component 265 (represented as implementing p text extraction threads in FIG. 3) which extracts text from downloaded documents 260 in order to generate text files 280. In some embodiments, text extraction component 265 is also configured to implement filtering functions to control which text from downloaded documents 260 is added to text files 280. In doing so, text extraction component can limit which text from a particular document is added to text files 280, or it can limit which documents are used to extract text for populating text files 280. The two filtering functions illustrated, namely anti-junk filter 270 and language autodetect filter 275, are also illustrated in FIG. 4 in the form of corresponding steps and are described below in greater detail.

At this point the text extraction threads use a word-breaker 285 (shown as q word breaker instances in FIG. 3) to extract random words from the text files 280. They place these words in the words queue 210. After completing this stage, the system repeats all the steps outlined, in a self-feeding loop.

Load Balancing Technique

The design of DCG system 200 allows it to scale up and down to any machine configuration and achieve any kind of data volatility (refresh rate). On high-end machines with multiple processors and large amounts of memory, the number of threads used for web searches (variable "n" in FIG. 3) and the number of threads used for Text Extraction (variable "p" in FIG. 3) can be resized on the fly as hardware resources become available or are requested by the operating system for other processes. Likewise, the size of the queues can be resized to achieve optimal performance. The size of the words queue 210 (variable "m" in FIG. 3) and the URLs queue 235 (variable "o" in FIG. 3) can be tuned until the system achieves the desired performance.

By adjusting these very simple parameters, the volatility of the dynamic corpus (text files 280) can be fully controlled. For example, assume that a user wants a dynamic corpus of size x sentences that completely "refreshes" in y hours. There is the startup overhead: the initial period of time necessary to gather the first x sentences. After that and based on how long it took to get the first x sentences, the system can re-adjust itself (tuning variables m, n, o, and p) so that it will take y hours to gather the next x sentences. The system can continuously monitor itself to achieve the required goal of x/y sentences per hour based on statistical evaluation of previous performance.

Note that the queues 210 and 235 can act as load balancers in the system to prevent the web threads from overloading the system, simply by having a finite size. For example, in this system the web threads 215 enqueue URLs in the URLs queue 235, and the text extraction threads 240 dequeue URLs from the URLs queue. If the web threads 215 are working too fast for the text extraction threads 240, they are enqueueing elements faster than they can be dequeued. Since the URLs queue 235 is of finite size, the system will eventually not be able to enqueue any more URLs, and the web threads 215 will be forced to pause until the text extraction threads 240 can catch up with them. Once the text extraction threads 240 have made space available in the URLs queue 235 by dequeuing URLs, the web threads can resume adding new URLs to the queue.

The opposite situation is also handled. The text extraction threads 240 enqueue words in the words queue 210, and web threads 215 dequeue words from it. If the text extraction threads 240 are working faster than the web threads 215, the words queue 210 will eventually run out of space, and the text extraction threads 240 will be forced to pause until the web threads 215 can catch up with them.

There are two possible deadlock situations that must be prevented. One is a situation in which the web threads 215 are waiting for the text extraction threads 240, and the text extraction threads are waiting for the web threads. This will only happen if both queues are completely full. A simple regular check for this situation prevents deadlock. In this event, system 200 discards some number of objects in each of queues 210 and 235, with the number being optional based on system parameters, desired recovery performance, etc. The other deadlock situation occurs when the web search threads have consumed all the words in the words queue and the text extraction threads have exhausted all the URLs from the URLs queue, so they are unable to add new words to the words queue. This will only happen if both queues are completely empty. The solution for this is to re-load the original seed 205 and reshuffle the words in the words queue 210. If the system does not reshuffle the words, the same results will be obtained. If the seed is big enough (for example 10,000 entries), it can potentially be shuffled any number of times without getting the same results.

Language Detection

In accordance with some disclosed embodiments, the DCG system 200 uses a number of techniques called "filters" to determine whether the sentences gathered from a particular file are indeed of the human language desired or not. Not all "hits" will be of the desired language. Each filter will potentially discard a number of hits that are not approved by the filtering algorithm. Examples of these filters are illustrated in FIGS. 2 and 4.

There are basically two performance bottlenecks to the system: (1) requesting a document from a server possibly half-way across the world (network-bound), and (2) extracting the text from a downloaded document (CPU-bound). The DCG applies a number of heuristics to filter out false-language hits before they reach either of these bottlenecks.

FIG. 4 is a flow diagram illustrating a process or method which can be implemented by DCG system 200. As illustrated at step 405, the method includes asking a search engine for documents containing words from the words queue 210, in this example words x, y and z. In the flow diagram shown in FIG. 4, it is shown for illustrative purposes that such a search request would result in the return of a number of hits (URLs in this case) represented at reference number 406. However, as will be described in greater detail, filters are used to limit the performance bottlenecks.

Before requesting a document from a World Wide Web server, in some embodiments, the system is configured to perform step 410 to implement country domain filter 225 shown in FIG. 2 to trim down the number of hits (URLs at this stage) to a lesser number, as represented at reference number 411. In these embodiments, the system looks at the domain of the URL. It could be ".com", ".gov", ".org", etc, or it could be a country domain such as ".uk" for United Kingdom or ".es" for Spain. For example, if the human language requested is British English, the system only downloads URLs from the ".uk" ("United Kingdom") domain. This does not guarantee that the page requested is indeed British English: anybody can buy a .uk domain, anywhere in the world, and British servers do not have to have the .uk domain. Furthermore, simply because a server is in a given country does not mean that it contains a given language. Sometimes multiple languages are spoken in a country, such as Switzerland, where German, French, Italian and Romansch are spoken. A language can be from a particular region of a country, but not be found on websites with that country's domain. For example, most Catalan websites do not use the Spanish domain ".es" even though Catalan is spoken in one region of Spain. However, the domain-filtering heuristic works well for a number of languages, and especially for isolating documents in sublanguages such as Iberian and Brazilian Portuguese. This heuristic also helps distinguish closely related languages such as Malay and Indonesian.

The DCG 200 has a unique implementation that optimizes correct language identification based on the country domain. In some embodiments, the DCG has four different settings. Depending on the target language, one of these settings will provide optimal language identification results:

(1) The strictest setting allows only pages from the countries where the language is spoken.
(2) The second setting allows non-country domains such as .com, .org, or .gov, but if the domain is a country domain, it only allows pages from a list of countries where the target language is spoken.
(3) The third setting allows any pages except from the countries where a very similar language is spoken. For example, since Malay and Indonesian are extremely similar, it does not allow any pages from the ". id" domain when trying to gather Malay corpora.
(4) The fourth setting allows all pages regardless of the domain.

Other small heuristics are used by the system to filter out hits in the wrong language. The system looks for small hints in the URL—this is called the URL Hints Filter (shown at 230 in FIG. 2), the implementation of which is illustrated at step 415 in FIG. 4. For example, in distinguishing between Indonesian and Malay, if the URL has the string "Malay" in it, there is a better chance that in contains Malay than Indonesian. In general, a URL hints filter can be configured to look for common words for a target language (or alternatively for a language which is close to the target language and which therefore may need to be excluded). Other examples of URL hints filter words can include cities of particular countries, foods of particular countries, etc., which are common to one language, but not to others. In FIG. 4, implementation of step 415 (URL hints filter 230) is shown with the result being a further trimmed down number of hits (URLs at this stage), as represented at reference number 416. However, it must be noted that the illustrated number of hits is diagrammatic only. For example, the URL hints filter can be implemented before the country domain filter in other embodiments, which would change the relative number of hits remaining at each of these stages.

After downloading the document designated at a URL in queue 235 (i.e., using document downloading component 245 shown in FIG. 2 and represented at step 420 in FIG. 4), resulting in a number of hits (documents at this stage) as represented at reference number 421, DCG system 200 can look at important metadata present in the binary formats, such as character set information in HTML files and language information encoded in Word files for ranges of text in the file, etc. The implementation of character set filter 250 and document metadata filter 255 (both shown in FIG. 2) is illustrated in FIG. 4 at steps 425 and 430, resulting in reduced numbers of hits (again a reduced number of documents at this stage) as represented at reference numbers 426 and 431. The character set requirements differ for different languages. For example, the DCG requires the proper character set for Cyrillic languages, right-to-left languages, Indic and Far East languages—but generally Western languages do not require a specific character set.

Once the raw text has been extracted from the downloaded binary files (using text extraction component 265 shown in FIG. 2 and represented at step 435 in FIG. 4), the DCG implements, in some embodiments, anti-junk and language autodetect filters (filters 270 and 275 shown in FIG. 2) to reduce the number of hits (extracted text at this instance) 436. This is shown in FIG. 4 at steps 440 and 445, with the result being a reduced number of hits (still extracted text) as represented respectively at reference numbers 441 and 446.

To implement filter 275, the DCG can use a language auto-detect ("LAD") system such as the one described by U.S. Pat. No. 6,272,456, entitled "System and Method for Identifying The Language of Written Text Having a Plurality of Different Length N-Gram Profiles" to validate that the language recognized is the target language. Most text extracted from binary formats via IFilter will have some undesired tags at the beginning and the end, so for language auto-detection purposes, in one example embodiment, the first 1024 characters and the last 1024 characters can be removed (often removing headers and footers), and 10% of the remainder of the document can be randomly sampled, up to 32,768 characters.

Since language auto-detect may be CPU-intensive, the DCG has a few smaller filters that can be applied first, such as character-range language identification (i.e. Tibetan text is expected to be in the Unicode range '\x0F00' to '\x0FFF', if no more than 60% of characters fall in this range the page should be discarded). Likewise an anti-junk filter can measure ratio of valid characters to characters that could be considered junk if an excessive quantity of them is present in a document (e.g. whitespace, numbers, symbols, punctuation, etc). These filters are quick and can be applied before incurring in the overhead of running a more complex language auto-detection scheme.

Some disclosed embodiments include the new concept of auto discovery of refreshing data sources. In these embodiments, the DCG system keeps track of URLs visited as well as the last time a URL was visited. If it notices that the content of a URL has been modified, it marks it internally as a possible "refreshing data source", that is, a URL that is modified frequently. Examples of these would be blogs or newspapers, which contain different information daily. In languages for which there is not a lot of text available on the World Wide Web, auto discovery of refreshing data sources is very important for meeting a quota of sentences needed for a corpus. The DCG generates a list of these sources based on how often they change and what percentage of the text changes. A personal website whose owner makes small proofing changes regularly will not be identified as a potential source of "refreshing data", since the percentage modified is very small. Likewise a website that is drastically changed once every 2 months will not be identified either, because the frequency is not within the threshold.

Figure 5:
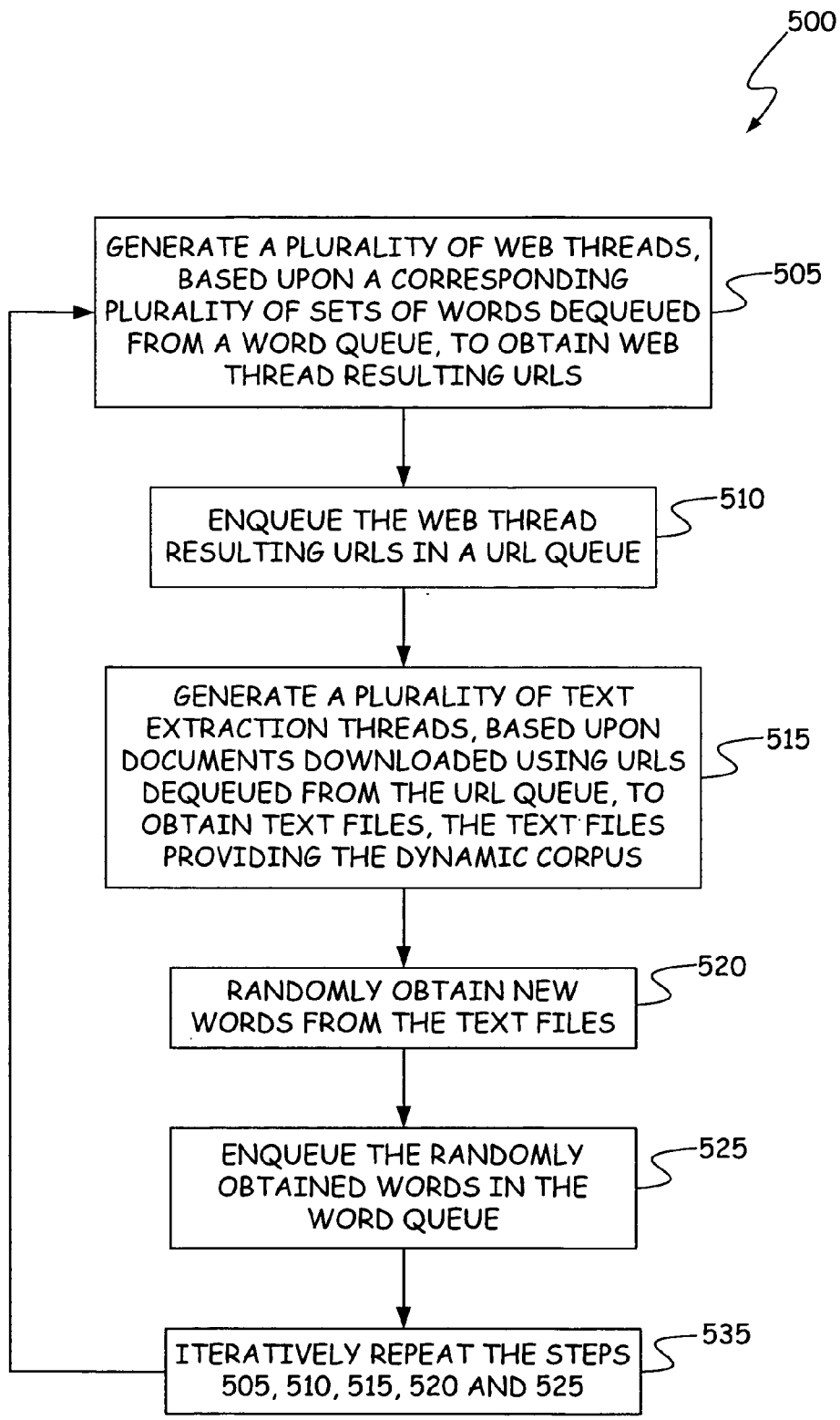
FIGS. 5 and 6 are flow diagrams illustrating embodiments of disclosed methods.
Figure 6:
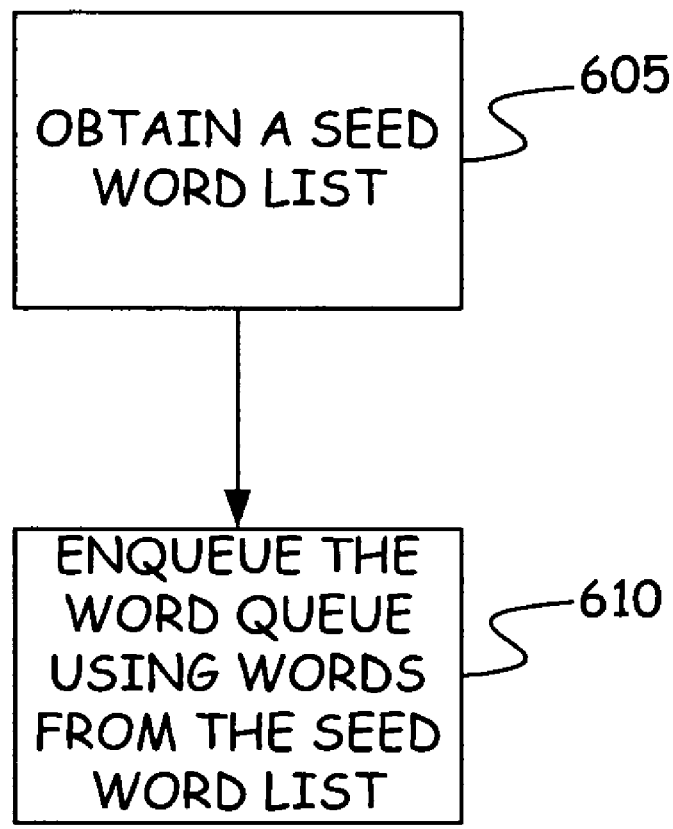

Example embodiments of the disclosed methods of generating a dynamic corpus can further be represented in the flow diagrams shown in FIGS. 5 and 6. For example, as shown in FIG. 5, a method embodiment 500 can include the step 505 of generating a plurality of web threads, based upon a corresponding plurality of sets of words dequeued from a word queue, to obtain web thread resulting URLs. The web thread resulting URLs are then enqueued in a URL queue as shown at step 510. Using URLs dequeued from the URL queue, a plurality of text extraction threads are generated to obtain text files. This is shown at step 515 in FIG. 5. As noted above, the text files providing the dynamic corpus. Then, to keep the corpus dynamic in nature, the method includes the step 520 of randomly obtaining new words from the text files. These new words are then enqueued in the word queue using step 525. Step 530 also illustrates the dynamic nature of the process with steps 505, 510; 515, 520 and 525 iteratively repeated.

FIG. 6 illustrates additional steps 605 and 610 which can be used to initialize the dynamic corpus generation process as described above. As shown, step 605 includes obtaining a seed word list. Step 610 then includes enqueueing the word queue using words from the seed word list. Other more detailed embodiments of the steps shown in FIGS. 5 and 6 can be as described above and as illustrated in FIGS. 1-4.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of generating a dynamic corpus, the method comprising:
   (a) generating a plurality (n) of web threads, based upon a corresponding plurality of sets of words dequeued from a word queue of size m words, to obtain web thread resulting URLs, the web thread resulting URLs being returned by search engines in response to receiving the plurality of sets of words as search requests, the web thread resulting URLs corresponding to websites having text that includes the plurality of sets of words;
   (b) enqueueing the web thread resulting URLs in a URL queue of size o words;
   (c) generating a plurality (p) of text extraction threads, based upon documents downloaded using URLs dequeued from the URL queue, to obtain text files, the text files providing the dynamic corpus;
   (d) randomly obtaining new words from the text files;
   (e) enqueueing the randomly obtained words in the word queue;
   (f) iteratively repeating the steps (a), (b), (c), (d) and (e) to obtain the dynamic corpus having a predefined size of x first text files, wherein repeating the step (a) includes utilizing the randomly obtained words as additional search requests and receiving additional thread resulting URLs from the search engines in response to the additional search requests, the additional thread resulting URLs corresponding to websites having text that includes the randomly obtained words;
   (g) adjusting variables n, m, o, p based on a time required to obtain the dynamic corpus with x first text files and based on a predefined refresh rate that specifies an amount of time within which a user desires the dynamic corpus to obtain x new text files so the x first text files are replaced within the dynamic corpus with the x new text files within the amount of time specified by the refresh rate; and
   iteratively repeating steps (a), (b), (c), (d), (e), (f) and (g).

2. The method of claim 1, and before step (a) of generating a plurality of web threads, the method further comprises:
   obtaining a seed word list; and
   enqueueing the word queue using words from the seed word list.

3. The method of claim 2, and prior to enqueueing the word queue using words from the seed word list, the method further comprises randomly shuffling the seed words list.

4. The method of claim 1, wherein step (a) of generating the plurality of web threads, based upon the corresponding plurality of sets of words dequeued from the word queue, to obtain web thread resulting URLs further comprises filtering out URLs having a particular domain.

5. The method of claim 4, wherein step (a) of generating a plurality of web threads, based upon the corresponding plurality of sets of words dequeued from the word queue, to obtain web thread resulting URLs further comprises applying a URL hints filter to filter URLs based upon one or more words common to a particular language.

6. The method of claim 1, wherein step (c) of generating the plurality of text extraction threads, based upon documents downloaded using URLs dequeued from the URL queue, to obtain text files further comprises filtering downloaded documents using a language autodetect filter to ensure that a language of the document is a desired language.

7. The method of claim 1, and further comprising increasing or decreasing at least one of a number of words in the word queue, a number of web threads in the plurality of web threads, a number of URLs in the URL queue, and a number of text extraction threads in the plurality of text extraction threads in order to optimize the generation of the dynamic corpus.

8. A computer-readable storage medium containing computer-executable instructions for implementing the steps of claim 1.

9. A dynamic corpus generation system comprising a computer with storage and a processor configured to implement the steps of method claim 1.

10. A dynamic corpus generating system comprising:
   a word queue;
   a web thread component generating a plurality (n) of web threads to obtain web thread resulting URLs, with each of the plurality of web threads being based on a search using a corresponding one of a plurality of sets of words dequeued from the word queue of size m words;
   a domain filter that filters the web thread resulting URLs based upon particular domains, the domain filter having a plurality of settings, one of the plurality of settings allowing only pages from domains associated with countries where a target language is spoken, a second one of the plurality of settings allowing pages from non-country domains and from the domains associated with the countries where the target language is spoken, a third one of the plurality of settings allowing pages from any domain except from domains associated with countries where a language similar to but different than the target language is spoken, and a fourth one of the plurality of settings allowing pages from all domains;
   a URL queue of size o entries in which the web thread resulting URLs are enqueued;
   a text extraction thread component generating text files from documents downloaded using URLs dequeued from the URL queue, the text files providing the dynamic corpus;
   a word breaker randomly obtain new words from the text files and to enqueueing the randomly obtained new words in the word queue for use in generating web threads in an iterative operation of the dynamic corpus generating system; and
   a computer processor, being a functional component of the system, activated by the text extraction thread component and the word breaker to facilitate generating the text files and randomly obtaining the new words, such that variables n, m and o are adjusted based on a statistical evaluation of how long it takes to obtain the dynamic corpus with a pre-specified number x of first text files and a pre-specified refesh rate, that indicates an amount of time y within which all x first text files are to be replaced with x new text files.

11. The dynamic corpus generating system of claim 10, and further comprising a seed word list from which the word queue is enqueued when initializing the dynamic corpus generating system.

12. The dynamic corpus generating system of claim 10, wherein the web thread component further comprises a URL hints filter which filters the web thread resulting URLs based upon words common to a particular language.

13. The dynamic corpus generating system of claim 10, wherein the text extraction thread component includes a document downloading component configured to download the documents using the URLs dequeued from the URL queue and to filter out some of the downloaded documents.

14. The dynamic corpus generating system of claim 13, wherein the document downloading component further comprises a character set filter used to filter out downloaded documents.

15. The dynamic corpus generating system of claim 13, wherein the document downloading component further comprises a document metadata filter used to filter out downloaded documents.

16. The dynamic corpus generating system of claim 13, wherein the text extraction thread component includes a text extraction component configured to extract text from downloaded documents and to filter out some of the extracted text in generating the text files which provide the dynamic corpus.

17. The dynamic corpus generating system of claim 16, wherein the text extraction component further comprises an anti-junk filter used to filter out extracted text.

18. The dynamic corpus generating system of claim 16, wherein the text extraction component further comprises a language autodetect filter used to filter out extracted text.

19. A computer-readable storage medium containing computer-executable instructions for implementing a dynamic corpus generating system, the dynamic corpus generating system comprising:

a word queue having m word entries;

a plurality (n) of web threads which obtain web thread resulting URLs, with each of the plurality of web threads being based on a search using a corresponding one of a plurality of sets of words dequeued from the word queue, the plurality of web threads including a country domain filter and a URL hints filter, the country domain filter filtering the web thread resulting URLs based on particular domains, the URL hints filter filtering the web thread resulting URLs based on common words in a target language;

a URL queue having o URL entries in which the web thread resulting URLs are enqueued;

a plurality (p) of text extraction threads which generate text files from documents downloaded using URLs dequeued from the URL queue, the plurality of text extraction threads including a document metadata filter, a character set filter, an anti-junk filter, and a language autodetect filter, the document metadata filter filtering the documents based on metadata associated with the documents, the character set filter filtering the documents based on character sets associated with the documents, the anti-junk filter filtering the text files based on a ratio of valid characters in the text files, the language autodetect filter filtering the text files based on an identified language of the text files;

a word breaker which randomly obtains new words from the text files and enqueues the randomly obtained new words in the word queue for use in generating new web threads in an iterative operation of the dynamic corpus generating system; and a controller statistically evaluating how long it takes to generate the dynamic corpus with x first text files and adjusting m, n, o and p, based on the statistical evaluation, so the x first text files are replaced with x new text files within a prespecified amount of time y.

* * * * *